(12) United States Patent
Reichert (10) Patent No.: US 7,557,998 B2
(45) Date of Patent: Jul. 7, 2009

(54) HIGH DISTORTED LENS

(76) Inventor: Abraham Reichert, 6 Nahal Kldron Street, Modiin 71700 (IL)

( * ) Notice: Subject to any disclaimer, the term of this patent is extended or adjusted under 35 U.S.C. 154(b) by 202 days.

(21) Appl. No.: 11/627,382

(22) Filed: Jan. 26, 2007

(65) Prior Publication Data

US 2007/0171545 A1 Jul. 26, 2007

(51) Int. Cl.
*G02B 3/00* (2006.01)
(52) U.S. Cl. .................. 359/662; 359/740; 359/792; 359/794

(58) Field of Classification Search .................. 359/662, 359/740, 792, 794
See application file for complete search history.

(56) References Cited

U.S. PATENT DOCUMENTS 4,178,075 A * 12/1979 Rogers ........................ 359/648

* cited by examiner

*Primary Examiner*—Joseph Martinez
(74) *Attorney, Agent, or Firm*—Dekel Patent Ltd.; David Klein (57) ABSTRACT

A lens with a very high degree of barrel distortion at the image plane (or pincushion distortion in object space).

9 Claims, 9 Drawing Sheets

HIGH DISTORTED LENS

FIELD OF THE INVENTION

The present invention relates generally to high distorted lenses.

BACKGROUND OF THE INVENTION

Figure 1:
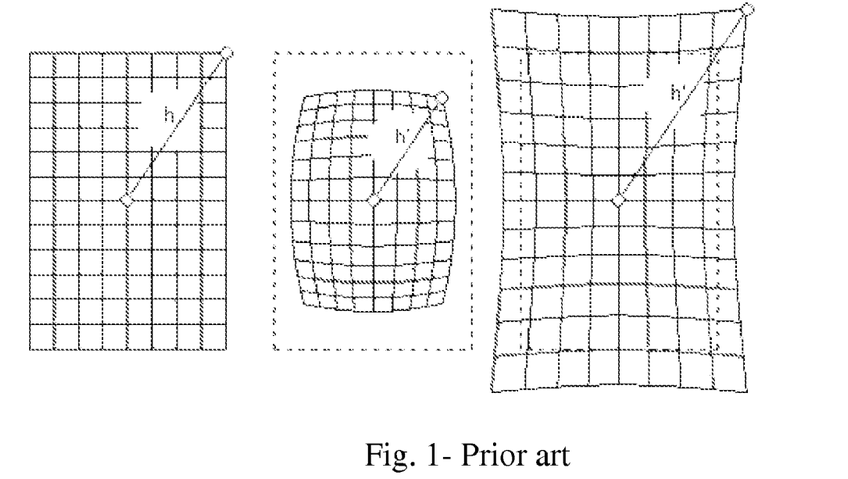
FIG. 1 is a simplified illustration of distortion of a rectangular grid of the prior art. Left: undistorted grid. Middle: grid with barrel distortion. Right: grid with pincushion distortion.

The distortion in a lens is a function of the field height and stop location. Distortion is measured as the relative discrepancy between real image height and the value predicted by paraxial theory. In FIG. 1, the distance from the image center to the corner of the grid is indicated by h for the orthoscopic case (no distortion), and by h' for the distorted grids. The relative distortion D is then given by (h'−h)/h.

Real-paraxial image height discrepancy varies with off-axis distance as $h'-h=ah^3+bh^5+\ldots$. Relative distortion varies as: $D=(h'-h)/h=ah^2+bh^4+\ldots$. The first coefficient, a, is positive for pincushion and negative for barrel distortion. Usually the quadratic term outweighs the higher-order terms and D essentially varies as h squared, increasing progressively toward the image corners.

The derivative of the distortion is $$dD/dh=2ah+4bh^3+6ch^5$$

SUMMARY OF THE INVENTION

The present invention seeks to provide a lens with a very high degree of barrel distortion at the image plane (or pincushion distortion in object space), as is described more in detail hereinbelow.

There is thus provided in accordance with an embodiment of the present invention an optical system including a lens system with a high degree of distortion at a relatively low angular FOV (field of view), the lens system including at least two groups of lenses, a first lens group facing an object space, and a second lens group closer to an image space of the lens, so that an aperture stop of the lens system is located between the lens groups and closer to the second lens group than the first lens group, wherein a distance of an entrance pupil of the lens system is larger than a distance from the first lens group to the aperture stop, and a ratio between an incident angle of a chief ray at a first surface of the second lens group and a chief ray angle at the entrance pupil increases non-linearly with angular field, thus producing a high degree of distortion across the field of view.

In accordance with an embodiment of the present invention, the optical system may further include an additional middle lens group in proximity to the aperture stop.

In accordance with another embodiment of the present invention, the optical system may further include a third lens group, wherein the first lens group faces the object space, the second lens group produces an intermediate image located between the second and third lens groups, and the third lens group acts as a relay lens to image the intermediate image onto a focal plane of the lens system, while the aperture stop is located between the first and second lens groups.

In accordance with yet another embodiment of the present invention, the lens system may further include a third lens group, wherein the first lens group faces the object space, the second lens group produces an intermediate image located between the second and third lens groups, and the third lens group acts as a relay lens to image the intermediate image onto a focal plane of the lens system, while the aperture stop is in proximity to the third lens group.

The first and second lens groups may have positive optical power. The additional middle lens group and the first lens group may have positive optical power. The third lens group and the first lens group may have positive optical power. The additional middle lens group may have less optical power than the first and second lens groups. The third lens group may have less optical power than the first and second lens groups.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 2:
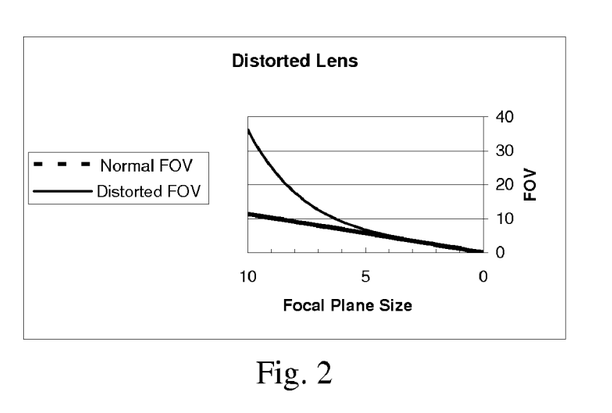
FIG. 2 is a simplified illustration of a very high degree of barrel distortion at the image plane in accordance with an embodiment of the present invention.

A system with barrel distortion at the image plane will have pincushion distortion in object space. Typical lenses have first-order distortion, so that the derivative of the distortion is linear with field height. In a typical optical design, distortion is reduced to a minimum. Embodiments of the present invention produce a very high degree of barrel distortion at the image plane (or pincushion distortion in object space). The shape of the desired distortion is shown in FIG. 2. The distortion can be "translated" into variation in lens magnification, or the equivalent variation of focal length across the field.

Figure 3:
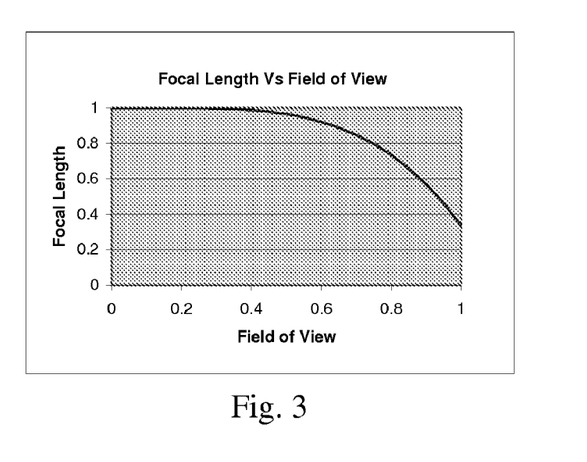
FIG. 3 is a simplified graphical illustration of focal length vs. field of view for a lens constructed in accordance with an embodiment of the present invention, which lens has a long focal length at the center of the field of view (FOV), and a short one at the edges.

In this embodiment, the lens has a long focal length at the center of the field of view (FOV), and a short one at the edges (FIG. 3).

Such a lens can be used in both direct and indirect viewing optical systems. In direct viewing systems, such as telescopes, the viewer will have a large magnification, providing a high-resolution view, within the central FOV, while having a low-magnification, low-resolution view of a wide FOV at the periphery. In indirect viewing optical systems, such as electronic cameras, the lens can be used either with a single display system to provide electronic zooming without loss of resolution, or with two or more display systems to provide a high-resolution view of the central FOV simultaneously with low-resolution views of larger FOVs.

Figure 4:
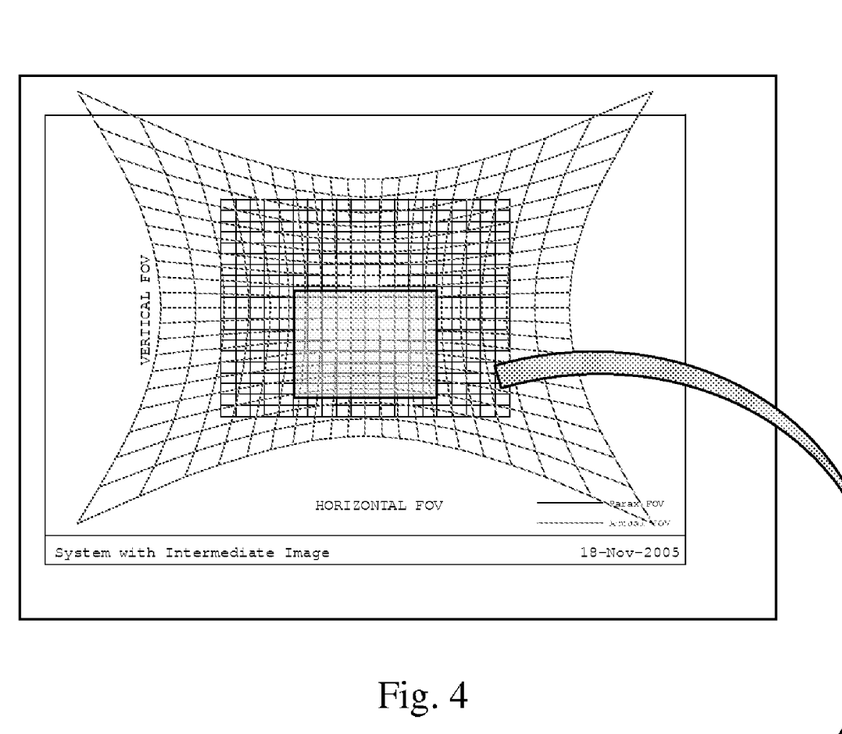
FIGS. 4 and 5 are simplified illustrations of digital zooming with the lens of the present invention.
Figure 5:
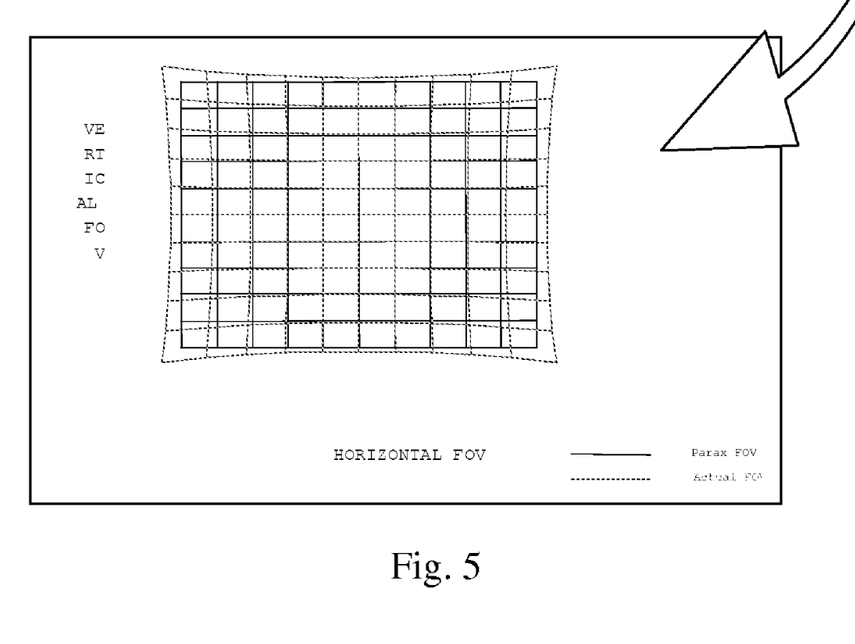

FIGS. 4 and 5 illustrate the concept of digital zooming. By the use of image processing, one can obtain digital zooming without loss of resolution at the central FOV at the high-magnification zoom position.

Figure 6:
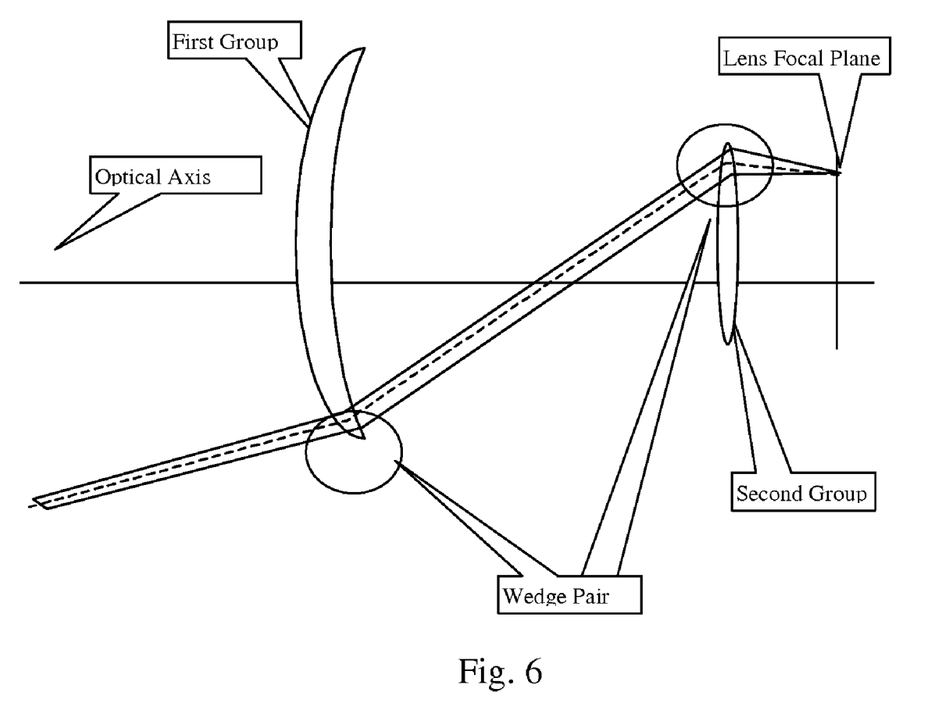
FIG. 6 is a simplified illustration of a lens constructed in accordance with an embodiment of the present invention.

FIG. 6 illustrates the concept of this lens. The lens is made up of two positive groups with the aperture stop located between them, and closer to the second group than to the first. The proximity of the stop to the second group forces the off-axis light beams to impinge on the outer surface of the second group at a high angle of incidence. The second group is thus the major contributor to non-linear distortion, while the positive meniscus shape of the first group contributes to the distortion, and reduces the total field angle of the input scene.

Figure 7:
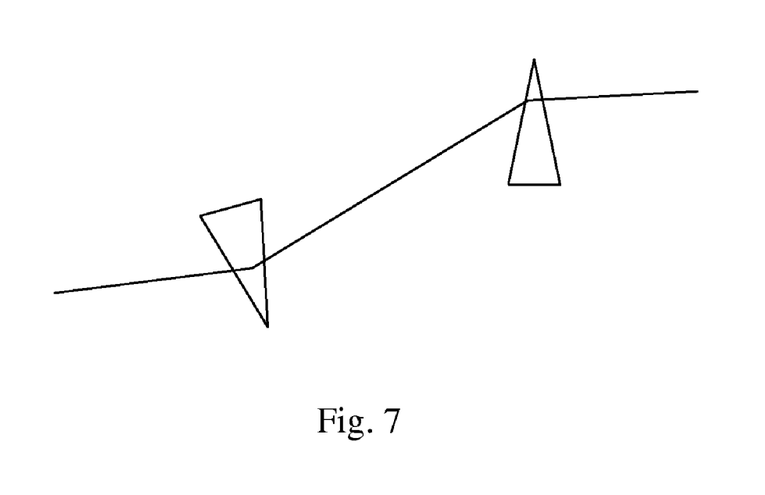
FIG. 7 is a simplified illustration of the effect produced by the outer zones of the lenses of two groups, in accordance with an embodiment of the present invention, similar to that of a wedge-pair telescope.

The effect produced by the outer zones of the lenses of the two groups is similar to that of a wedge-pair telescope as shown in FIG. 7.

Figure 8:
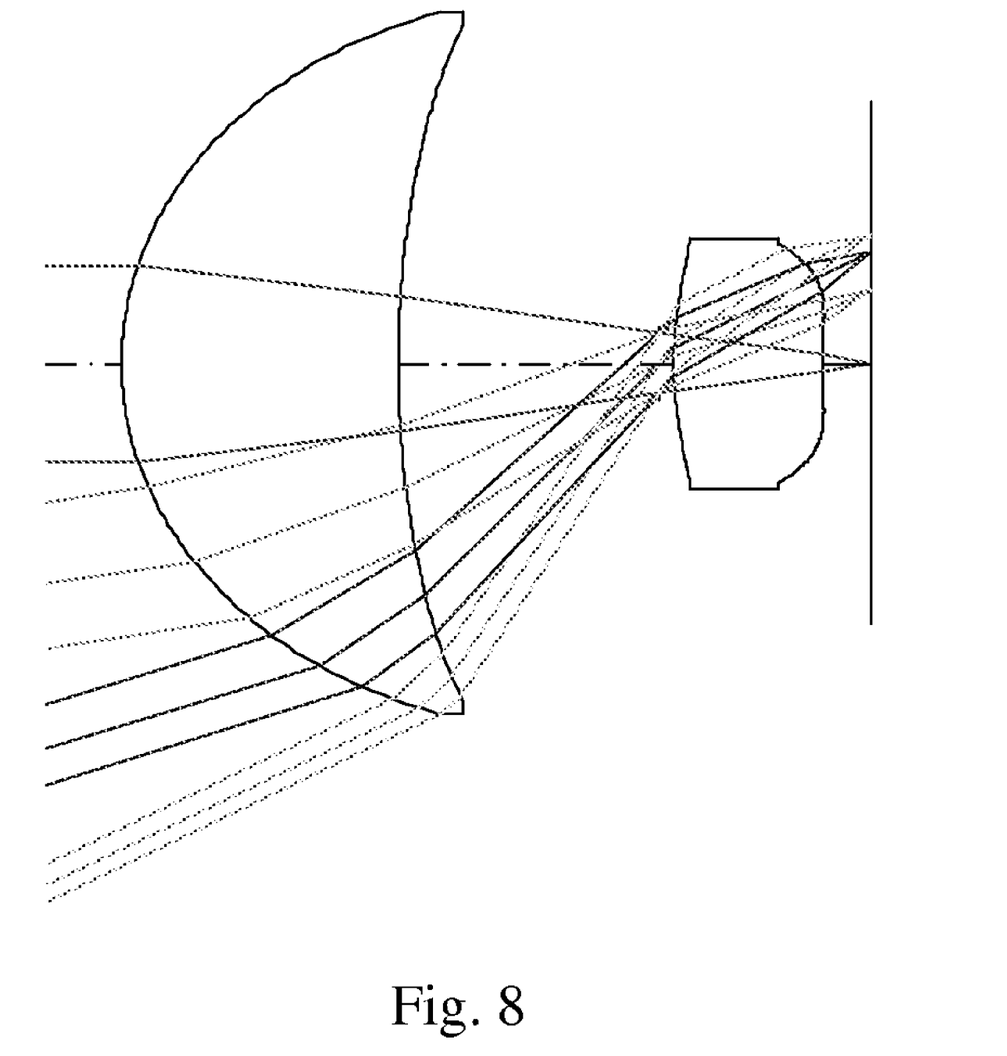
FIG. 8 is a simplified illustration of an optical system with a fixed effective focal length (EFL) at the central FOV, which shortens towards the marginal FOV, constructed in accordance with an embodiment of the present invention.

FIG. 8 illustrates an optical system with a fixed effective focal length (EFL) at the central FOV, which shortens towards the marginal FOV. The focal length of the lens is nearly constant within the central region, and varies rapidly towards the edge of the field. FIG. 3 illustrates the variation in focal length as a function of the FOV.

Figure 9:
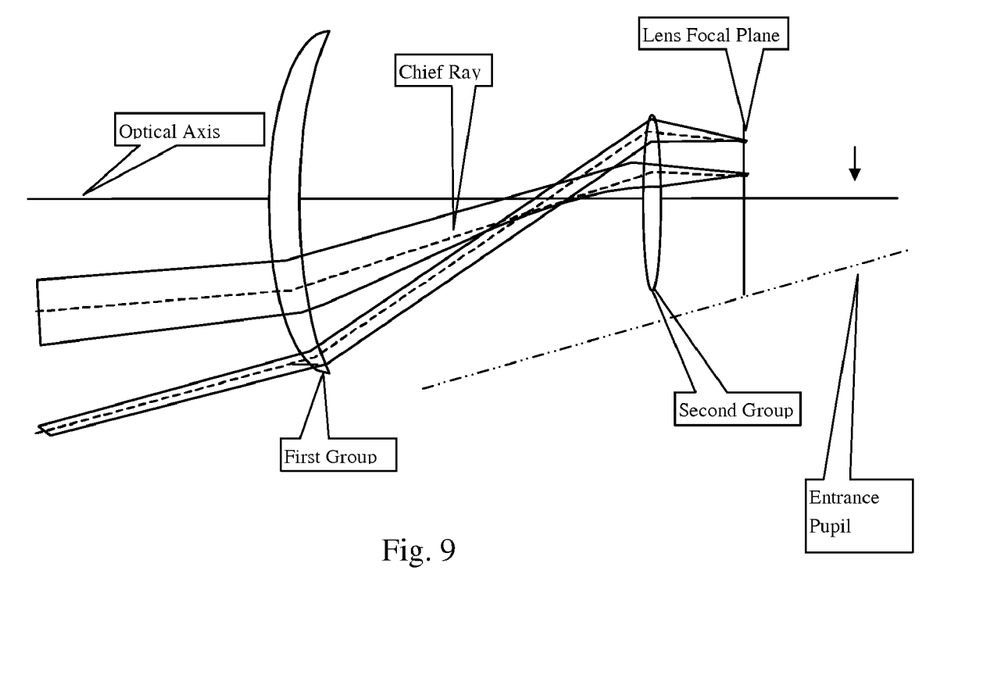
FIG. 9 is a simplified illustration of a lens system with a high degree of distortion at a relatively low angular FOV, constructed in accordance with another embodiment of the present invention.

FIG. 9 illustrates a lens system with a high degree of distortion at a relatively low angular FOV. This lens system is based on at least two groups of lenses, a first group facing the object space and a second group being closer to the image space of the lens system, so that the aperture stop of the lens system is located between the two lens groups and is closer to the second lens group than to the first lens group. The distance of the entrance pupil of the lens is larger than the distance from the first lens group to the stop, and the ratio between the angle of incidence of any chief ray at the first surface of the second group and the chief ray angle at the entrance pupil increases non-linearly with angular field, thus producing a high degree of distortion across the field of view.

Figure 10:
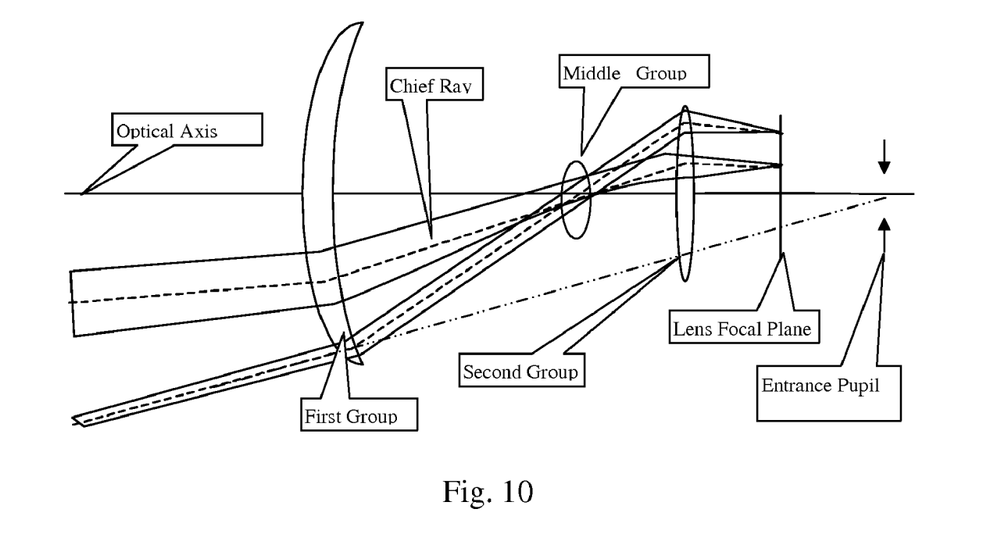
FIG. 10 is a simplified illustration of a lens system with a high degree of distortion at a relatively low FOV angle, constructed in accordance with yet another embodiment of the present invention.

FIG. 10 illustrates a lens system with a high degree of distortion at a relatively low FOV angle. This lens system is based on three groups of lenses, a first group facing the object space and a second group being closer to the image space of the lens system, so that the stop of the lens system is located between these two lens groups and closer to the second lens group than to the first lens group. The distance of the entrance pupil of the lens is larger than the distance from the first lens group to the stop, and the ratio between the angle of incidence of any chief ray at the first surface of the second lens group and the chief ray angle at the entrance pupil increases non-linearly with the field, thus producing a high degree of distortion across the field of view. The embodiment of FIG. 10 includes an additional middle lens group in proximity to the stop.

Figure 11:
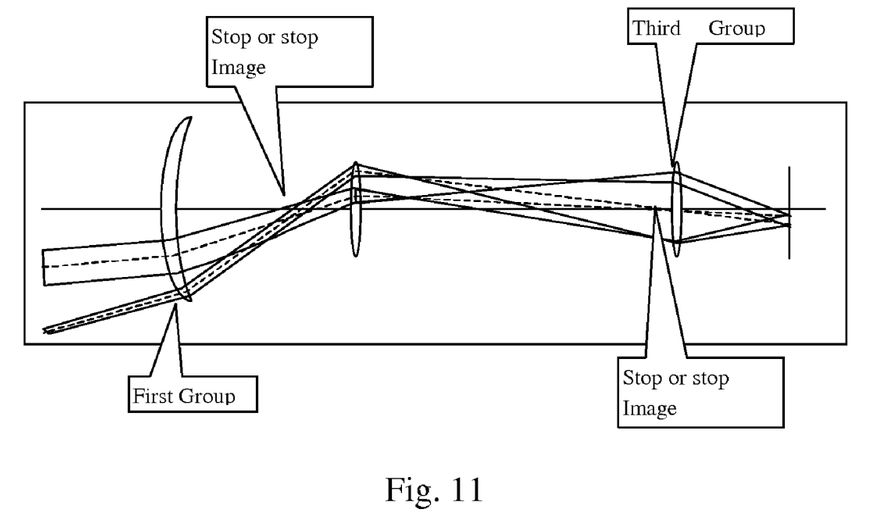
FIG. 11 is a simplified illustration of a lens system with high a degree of distortion at a relatively low FOV angle, constructed in accordance with still another embodiment of the present invention.

FIG. 11 illustrates a lens system with high a degree of distortion at a relatively low FOV angle. This lens system is based on at least three groups of lenses, a first group facing the object space, a second group producing an intermediate image, and the stop, or its image, located between the first and second lens groups, and a third lens group acting as a relay lens to image the intermediate image onto the focal plane of the lens system. The second lens group, either alone or in conjunction with the third group, images the aperture stop (or aperture stop image) which is located between the first and second lens groups to a point in proximity to the third lens group, such that the actual aperture stop may be located either between the first and second lens groups, or in proximity to the third lens group. The ratio between the angle of incidence of any chief ray at the first surface of the second lens group and the chief ray angle at the entrance pupil increases non-linearly with the field, thus producing a high degree of distortion across the field of view.

Figure 12:
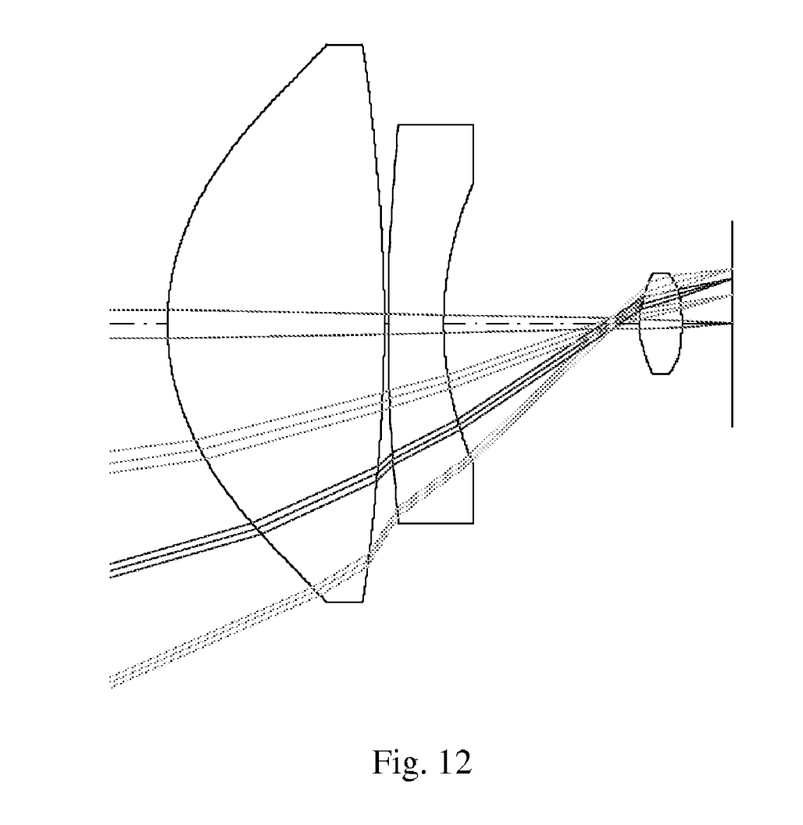
FIG. 12 is a simplified illustration of a lens constructed in accordance with another embodiment of the present invention.

FIG. 12 is a lens with the following description:

| | Radius | Conic Constant | Coefficient a | Coefficient b | Coefficient c | Thickness | Plastic |
|---|---|---|---|---|---|---|---|
| 1 | 106.98 | −0.912 | 0.312E−07 | 0.1116E−12 | −.178E−15 | 94.39 | Acrylic |
| 2 | −629.07 | | 0.179E−07 | −.118E−12 | −.297E−16 | 1.65 | |
| 3 | 833.85 | | | | | 24.11 | Polycarbonate |
| 4 | 151.60 | | | | | 73.04 | |
| STO: | Infinity | | | | | 11.67 | |
| 6 | 27.32 | −5.689 | | | | 18.65 | Acrylic |
| | −166.89 | | −.225E−04 | 0.604E−08 | 0.391E−11 | 22.33 | |
| IMG: | Infinity | | | | | | |

Figure 13:
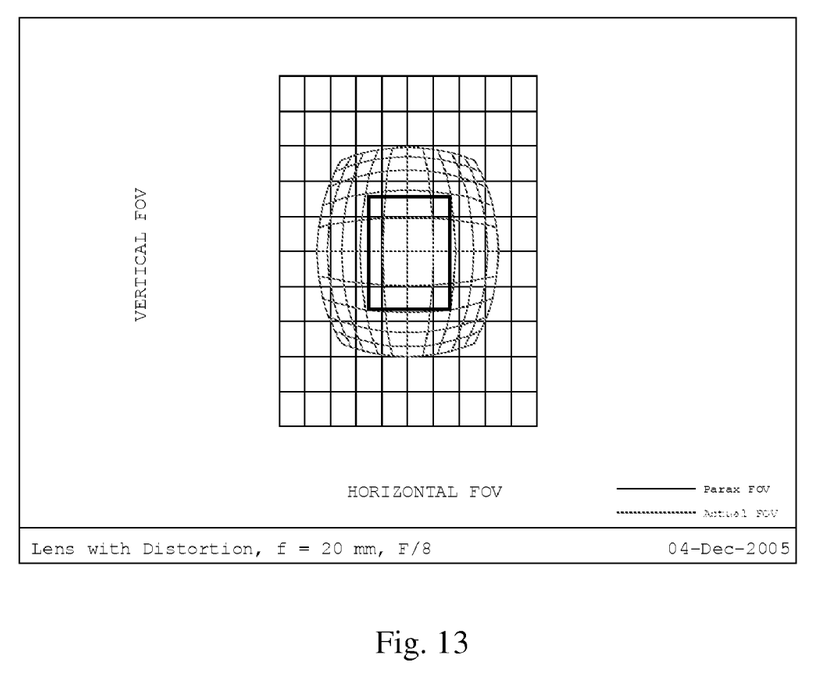
FIG. 13 is a simplified illustration of the distortion of the entire FOV of the lens of FIG. 12.
Figure 14:
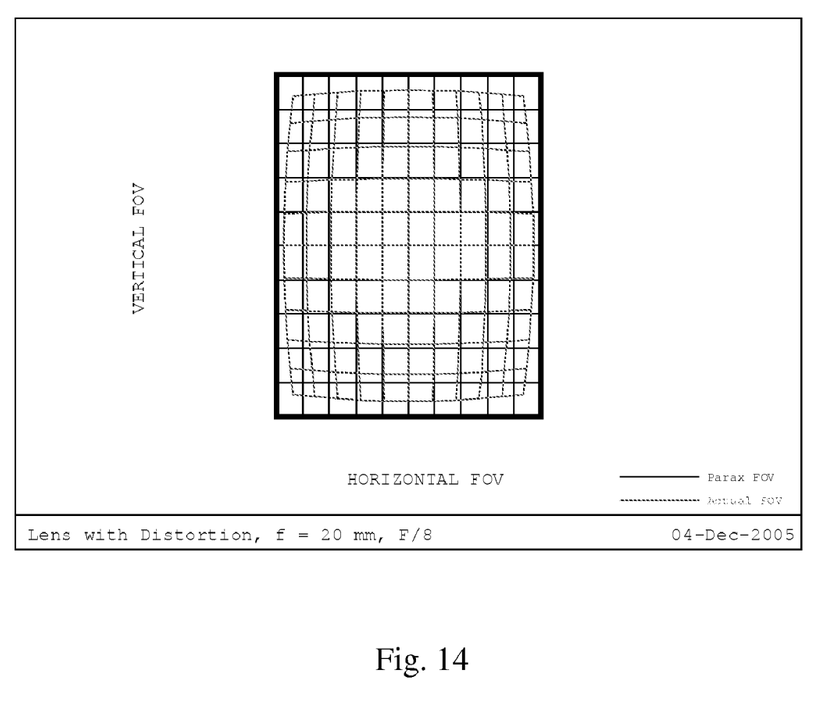
FIG. 14 is a simplified illustration of the distortion of the middle part of the FOV of the lens of FIG. 12.

FIG. 13 illustrates the distortion of the entire FOV of the lens of FIG. 12 and FIG. 14 illustrates the distortion of the middle part of the FOV.

Figure 15:
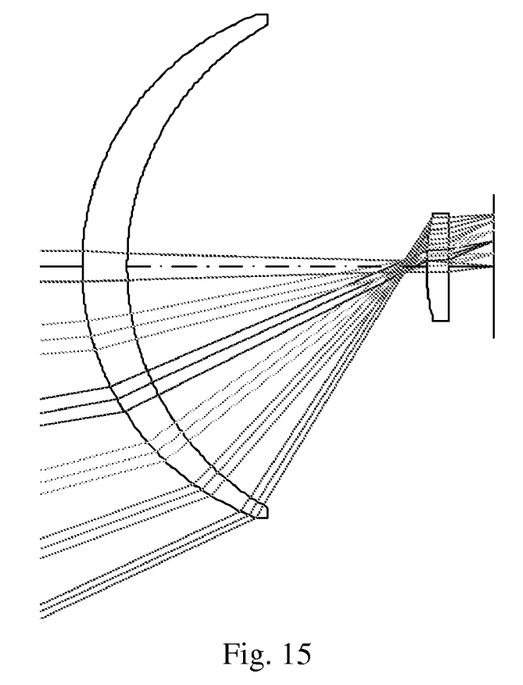
FIGS. 15-17 are simplified illustrations of other embodiments based on the invention.
Figure 16:
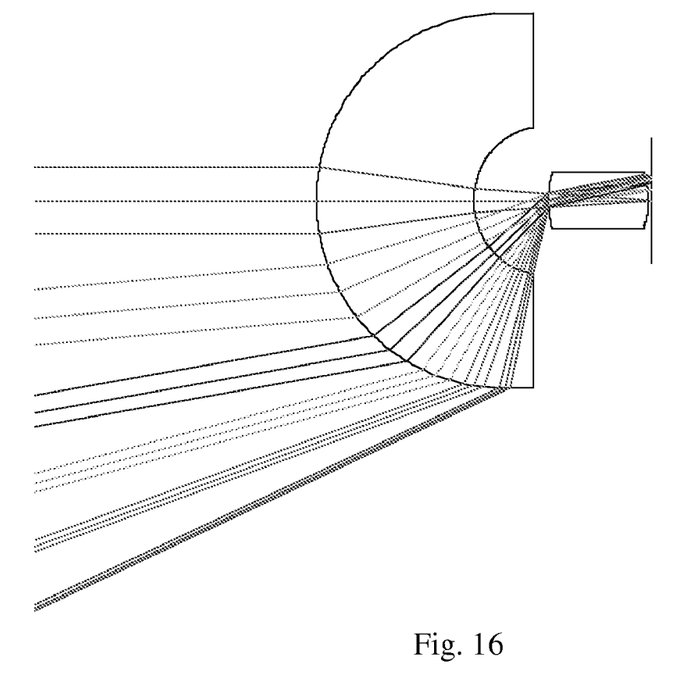
Figure 17:
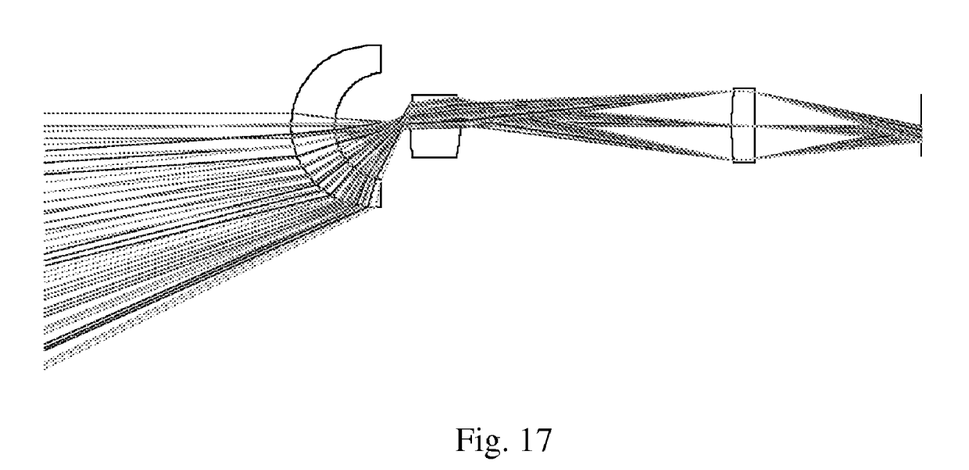

FIGS. 15-17 illustrate other embodiments based on the invention.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. An optical system comprising:
a lens system with a high degree of distortion at a relatively low angular FOV (field of view), said lens system comprising at least two groups of lenses, a first lens group facing an object space, and a second lens group closer to an image space of said lens, so that an aperture stop of said lens system is located between said lens groups and closer to the second lens group than the first lens group, wherein a distance of an entrance pupil of said lens system is larger than a distance from the first lens group to the aperture stop, and a ratio between an incident angle of a chief ray at a first surface of said second lens group and a chief ray angle at the entrance pupil increases non-linearly with angular field, thus producing a high degree of distortion across the field of view.

2. The optical system according to claim 1, further comprising an additional middle lens group in proximity to the aperture stop.

3. The optical system according to claim 2, wherein said additional middle lens group and said first lens group have positive optical power.

4. The optical system according to claim 2, wherein said additional middle lens group has less optical power than said first and second lens groups.

5. The optical system according to claim 1, wherein said lens system comprises a third lens group, wherein the first lens group faces the object space, the second lens group produces an intermediate image located between the second and third lens groups, and the third lens group acts as a relay lens to image said intermediate image onto a focal plane of said lens system, while the aperture stop is located between the first and second lens groups.

6. The optical system according to claim 5, wherein said third lens group and said first lens group have positive optical power.

7. The optical system according to claim 5, wherein said third lens group has less optical power than said first and second lens groups.

8. The optical system according to claim 1, wherein said lens system comprises a third lns group, wherein the first lens group faces the object space, the second lens group produces an intermediate image located between the second and third lens groups, and the third lens group acts as a relay lens to image said intermediate image onto a focal plane of said lens system, while the aperture stop is in proximity to the third lens group.

9. The optical system according to claim 1, wherein said first and second lens groups have positive optical power.

\* \* \* \* \*